(12) United States Patent
Trefz

(10) Patent No.: US 7,104,036 B2
(45) Date of Patent: Sep. 12, 2006

(54) REVERSE IMPLEMENT OPTION USING REVERSE PEDAL

(75) Inventor: Harlin James Trefz, Jackson, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/977,174

(22) Filed: Oct. 29, 2004

(65) Prior Publication Data

US 2006/0096264 A1 May 11, 2006

(51) Int. Cl.
- *A01D 41/14* (2006.01)
- *A01D 41/127* (2006.01)
- *A01D 46/08* (2006.01)

(52) U.S. Cl. .............................. 56/10.2 R; 74/473.16; 74/473.17

(58) Field of Classification Search ............. 56/10.2 R; 180/53.1, 53.6, 336, 307; 318/282, 139; 192/219.6, 220.1, 219.4; 74/473.17, 483 R, 74/473.21, 473.25, 473.16
See application file for complete search history.

(56) References Cited

U.S. PATENT DOCUMENTS

| 5,022,477 A | 6/1991 | Wanie ........................ 180/6.34 |
| 5,048,638 A | 9/1991 | Duncan et al. .............. 180/307 |
| 5,586,955 A | 12/1996 | Wanie .......................... 477/99 |
| 5,994,857 A | 11/1999 | Peterson, Jr. et al. ........ 318/282 |
| 6,196,342 B1 * | 3/2001 | Teal et al. .................... 180/6.2 |
| 6,316,891 B1 | 11/2001 | Hough ......................... 318/282 |
| 2002/0194948 A1 * | 12/2002 | Sundaresan et al. .......... 74/560 |
| 2003/0010026 A1 * | 1/2003 | Evans et al. .................. 60/443 |

* cited by examiner

Primary Examiner—Árpád Fábián Kovács

(57) ABSTRACT

A reverse implement option for a tractor or mowing vehicle is activated by moving the reverse foot pedal to an intermediate position. An arm linked to the reverse foot pedal pivots in response to movement of the reverse foot pedal to the intermediate position to actuate a reverse sensing switch. The reverse sensing switch is actuated before a transmission control rod, which links the reverse foot pedal to a hydrostatic transmission swash plate, enables reverse travel of the tractor or vehicle. The PTO operates during reverse travel of the tractor if both the hand operated bypass switch and the reverse sensing switch are actuated.

6 Claims, 4 Drawing Sheets

REVERSE IMPLEMENT OPTION USING REVERSE PEDAL

FIELD OF THE INVENTION

This invention relates generally to lawn and garden tractors and/or mowing vehicles with an attachment driven by a controllable tool drive or power take off (PTO), and more specifically to mechanisms that allow use of the PTO while the tractor or vehicle travels in reverse.

BACKGROUND OF THE INVENTION

Vehicles such as lawn and garden tractors with PTO driven attachments, or mowing vehicles, may include an interlock circuit with several functions including the prevention of PTO operation when the tractor or vehicle travels in reverse. Under certain conditions, operation of the PTO or mowing blade(s) while the tractor or vehicle travels in reverse is necessary or desired. This may be referred to as a reverse implement option. Various override or bypass systems have been proposed for this purpose. Some of the override or bypass systems may also be referred to as latch circuits, which typically require the operator or driver to actuate one or more switches. For example, U.S. Pat. No. 5,994,857 assigned to Deere and Company of Moline, Ill., relates to an interlock circuit having several relays and a hand operated PTO switch provided with a momentary on (or override) position to allow operation of the PTO while the tractor or vehicle travels in reverse. U.S. Pat. No. 6,316,891, also assigned to Deere and Company, describes an interlock circuit having only a single relay, and an override or bypass system that does not require the operator to continuously push or hold the hand operated PTO switch to permit PTO operation while traveling in reverse.

Override or bypass systems may include a reverse sensing switch, in addition to a hand operated PTO switch. For example, the override or bypass system may allow PTO operation if a hand operated PTO switch is moved to a momentary on (or override) position, and the reverse sensing switch is closed or actuated, indicating the vehicle is in reverse. In vehicles having hydrostatic transmissions, the reverse sensing switch may be on the transmission or hydrostatic control rod.

After the operator actuates a hand operated PTO switch, the PTO override system may allow PTO operation to begin when the operator depresses the reverse foot pedal sufficiently for the reverse sensing switch to detect the tractor or vehicle is in reverse. The reverse sensing switch may detect the tractor or vehicle is in reverse beginning at a speed of zero mph. However, when the operator steps on the reverse pedal, the reverse sensing switch may not detect the tractor or vehicle is in reverse until after it has begun traveling in reverse. The reverse sensing switch may not be actuated at the same speed for all tractors or vehicles and/or operating conditions. For example, some machines or operating conditions may not detect the vehicle is in reverse and allow PTO operation until it reaches a speed of 0.75 mph in reverse. The override or bypass system also may unlatch at different speeds, depending on the tractor or vehicle condition and the operating conditions.

There is a need for a reverse implement option for a lawn and garden tractor or mowing vehicle that will provide a more predictable start of PTO operation when the tractor or vehicle begins travel in reverse. There is a need for more consistent PTO operation for traveling in reverse across different tractors or vehicles, and for different operating conditions.

SUMMARY OF THE INVENTION

The present invention provides a more predictable and consistent start for PTO operation. A reverse sensing switch is actuated in response to pivoting the reverse pedal to an intermediate position without enabling reverse travel of the tractor or mowing vehicle. The tractor or mowing vehicle has a forward foot pedal and a reverse foot pedal. The forward foot pedal pivots to enable forward travel of the mowing vehicle, and the reverse foot pedal pivots to enable reverse travel of the mowing vehicle. Actuation of the reverse sensing switch and at least one other switch enables mowing or PTO operation during reverse travel.

DESCRIPTION OF THE PREFERRED EMBODIMENT

Figure 1:
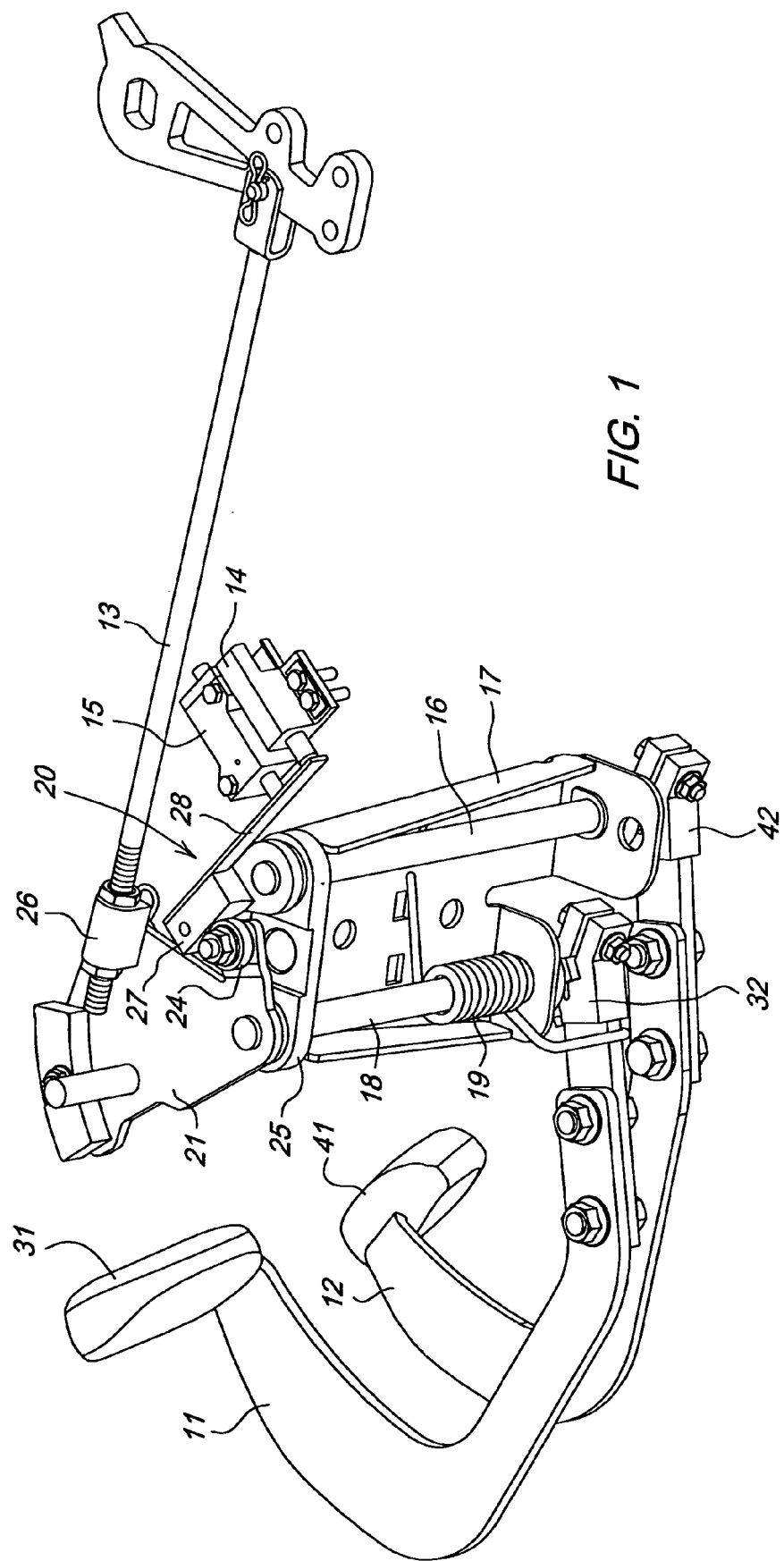
FIG. 1 is a perspective view of the reverse implement option using reverse pedal according to a first embodiment of the invention.

First referring to FIG. 1, one embodiment of the invention provides a reverse implement option for a lawn and garden tractor or mowing vehicle having a hydrostatic transmission operated by forward foot pedal 11 and reverse foot pedal 12. For example, the forward and reverse foot pedals may be operatively connected to a swash plate in the hydrostatic transmission. The tractor or vehicle also may have a hand operated throttle handle to control engine speed, while each foot pedal may control the swash plate angle to enable forward or reverse travel of the vehicle.

In one embodiment, forward foot pedal 11 may include a generally U-shaped lever with a first or upper end 31 and a second or lower end 32. The first end of the forward foot pedal may be in the cab or operator station of the tractor or vehicle, and the second end may be connected to shaft 18. Shaft 18 may be supported by and extend laterally through bracket 17 secured to the cab or chassis of the tractor or vehicle, and end plate 25 may be secured to bracket 17. Spring 19 may bias and urge forward foot pedal 11 toward the rest or fully extended position. An operator may depress, or pivot forward, forward foot pedal 11 to turn shaft 18 in a first, generally counterclockwise direction, preferably between about 5 degrees and about 45 degrees. The turning of shaft 18 causes plate 21, which is attached to shaft 18, to turn or pivot between about 5 degrees and about 45 degrees in the first or counterclockwise direction, to reach a maximum forward speed position.

In one embodiment, reverse foot pedal 12 also may include a generally U-shaped lever with a first or upper end 41 and a second or lower end 42. The first end of reverse foot pedal 12 may be positioned in the cab or operator station of the tractor or vehicle, and the second end may be connected to shaft 16. Shaft 16 may be supported by and extend laterally through bracket 17 and end plate 25. Arm 20 may extend from one end of shaft 16. The operator may depress, or pivot forward, reverse foot pedal 12 to turn shaft 16 and arm 20 in the first counterclockwise direction, preferably between about 5 degrees and about 45 degrees.

In one embodiment, the forward foot pedal and the reverse foot pedal may be mechanically linked to the swash plate of a hydrostatic transmission. For example, the foot pedals may be linked to transmission control rod 13 having a first end connected to plate 21 by pivoting collar 26, and a second end connected to the swash plate of a hydrostatic transmission. Turning or pivoting shaft 18 and plate 21 in a first or counterclockwise direction pulls transmission control rod 13 forward causing the transmission and/or swash plate to enable forward travel of the tractor or vehicle. Turning or pivoting plate 21 in a second or clockwise direction pushes transmission control rod rearward causing the transmission and/or swash plate to enable rearward travel of the tractor or vehicle. Although the transmission control rod is a preferred linkage between the foot pedals of the reverse implement option and a hydrostatic transmission, other mechanical or electromechanical linkages also may be used instead.

Figure 2:
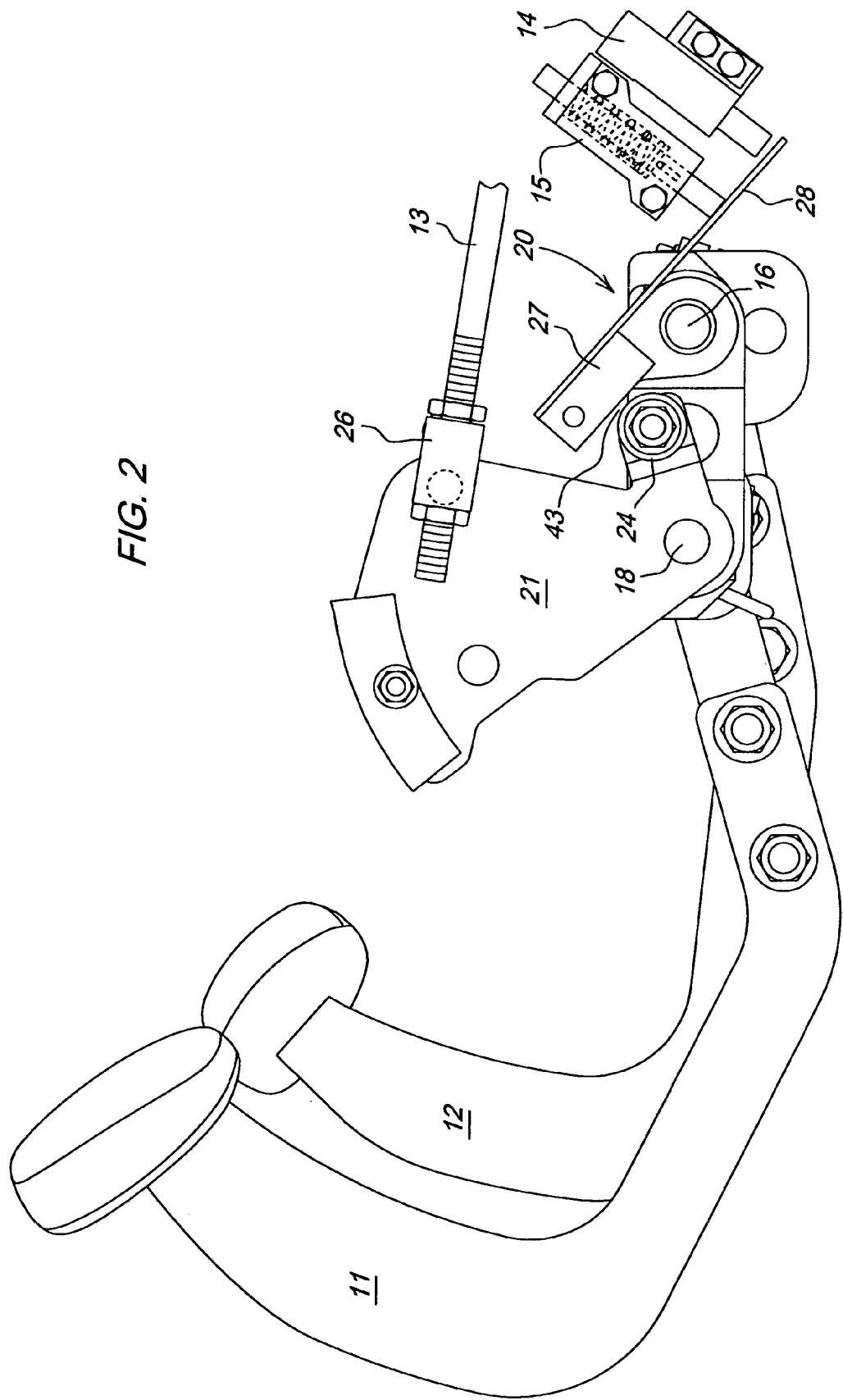
FIG. 2 is a side view of the embodiment of FIG. 1, with the reverse foot pedal in the rest or fully extended position.
Figure 3:
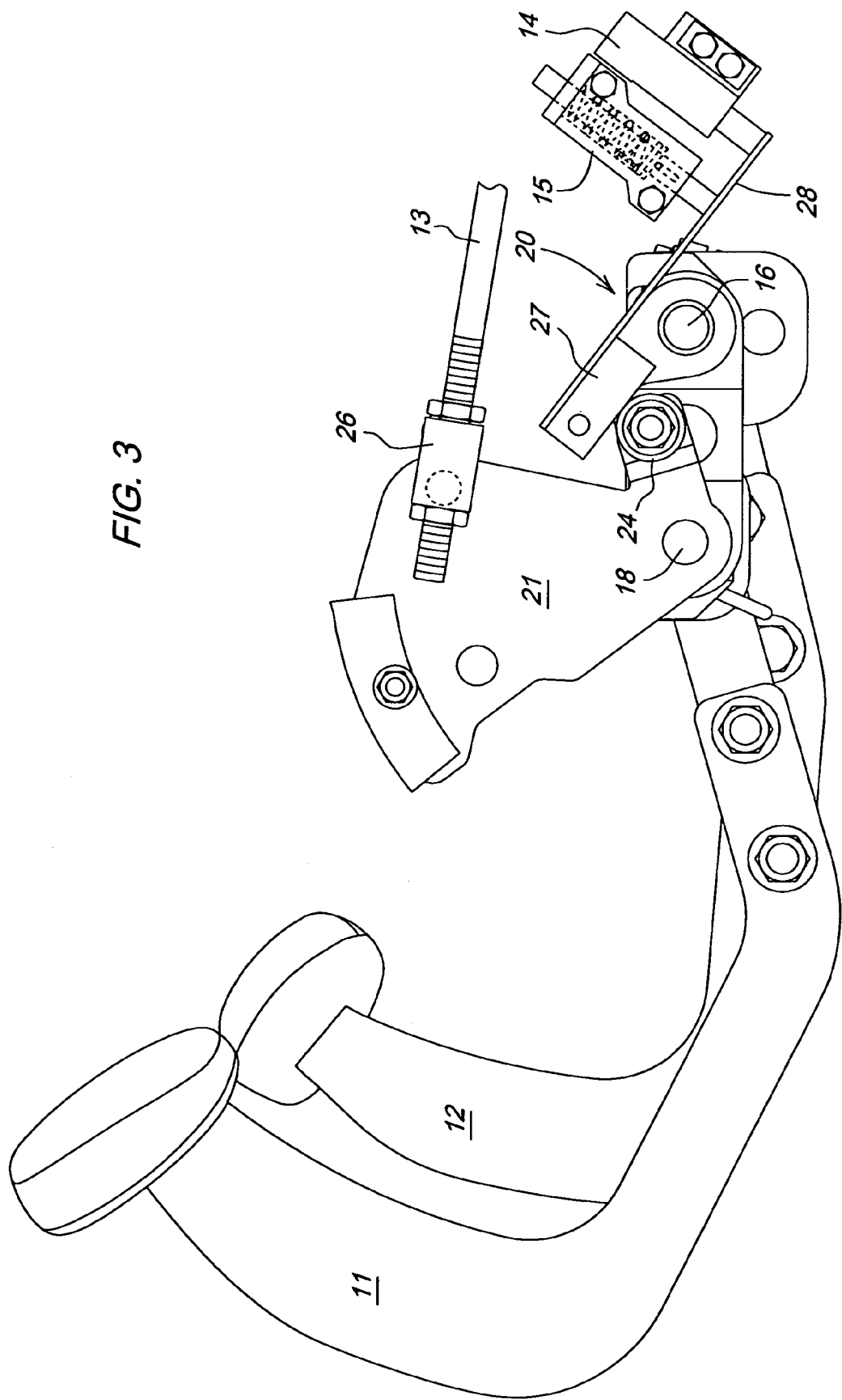
FIG. 3 is a side view of the embodiment of FIG. 1, with the reverse foot pedal in an intermediate position.

In one embodiment, as shown in FIG. 2, when reverse foot pedal 12 is at rest or at the fully extended position, reverse sensing switch 14 is off, or not actuated. As shown in FIG. 3, reverse sensing switch 14 may be switched on, or actuated, by depressing or pivoting the reverse foot pedal downward to an intermediate position.

In one embodiment, reverse sensing switch 14 may be a push button switch mounted or secured to the chassis or body of the tractor or vehicle. Reverse sensing switch 14 may be actuated by depressing the push button less than about 0.25 inches, and preferably less than about 0.1 inches. In one embodiment, the push button may remain actuated when it is depressed further to a maximum of about 0.5 inches to about 1 inch, by depressing or pivoting the reverse pedal further down from the intermediate position.

In one embodiment, the reverse implement option also may include a hand operated bypass switch (not shown) that must be actuated before the PTO will run while the vehicle travels in reverse. Thus, the PTO may run only if both the reverse sensing switch and the hand operated bypass switch are actuated, provided that one or more other conditions are satisfied. Those conditions may include, but are not limited to, detection of a seated operator.

In one embodiment, the reverse implement option may include a hand operated bypass switch with a first PTO off position, a second PTO on position, and a third or override position to allow PTO operation when the vehicle is in reverse. Alternatively, a hand operated bypass switch may be separate from a hand operated PTO switch. U.S. Pat. No. 5,994,857 shows an example of a circuit for a reverse implement option that allows PTO operation when both a hand operated bypass switch and a reverse sensing switch are actuated.

In one embodiment, the reverse implement option may include reverse sensing switch 14 that the operator may actuate by depressing reverse foot pedal 12 not more than about one inch down from the rest or fully extended position, causing the reverse foot pedal to pivot not more than about 10 degrees. Most preferably, reverse sensing switch 14 may be actuated by depressing reverse foot pedal 12 between about 0.1 inches and about 0.5 inches, pivoting between about 1 degree and about 5 degrees. Reverse sensing switch 14 may be actuated without turning plate 21, and without moving transmission control rod 13 or moving the swash plate in a hydrostatic transmission. Thus, reverse sensing switch 14 may be actuated before enabling the tractor or vehicle to travel in reverse.

Figure 4:
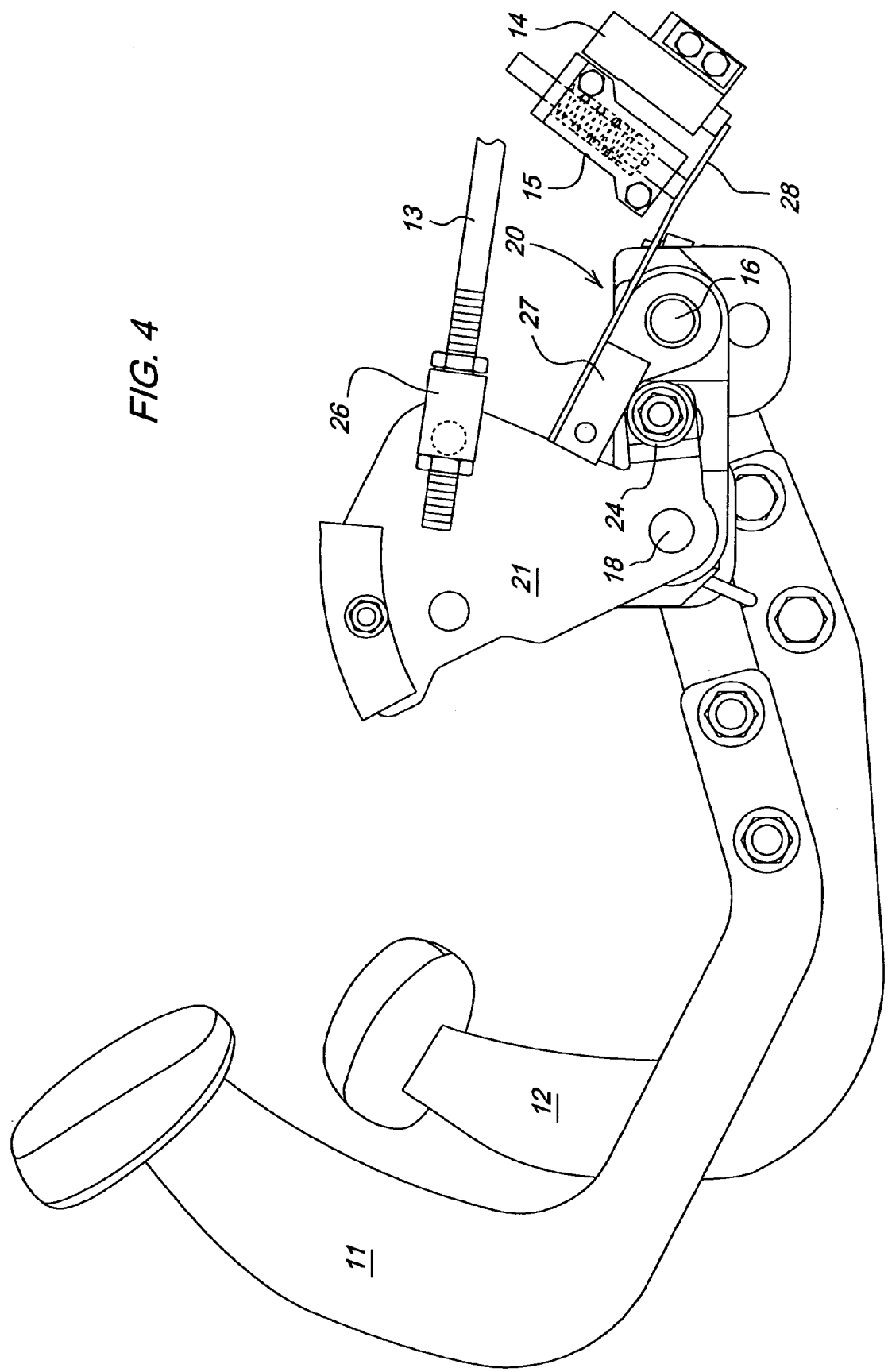
FIG. 4 is a side view of the embodiment of FIG. 1, with the reverse foot pedal in the fully depressed position.

The position of reverse foot pedal 12 when reverse sensing switch 14 is first actuated, before the transmission enables travel in reverse, may be referred to as the intermediate position. The intermediate position is shown in FIG. 3. To travel in reverse, the operator may depress or pivot reverse foot pedal 12 further beyond the intermediate position. FIG. 4 shows the position of the reverse foot pedal at maximum speed for travel in reverse.

In one embodiment, plate 21 includes abutment 24 which cooperates with the reverse foot pedal 12 and arm 20 to enable the tractor or vehicle to travel in reverse. For example, abutment 24 may be a roller or cam surface extending from plate 21. Arm 20 has a first end 27 and a second end 28, and may be connected to rod 16 between the first and second ends.

Referring back to FIG. 2, reverse foot pedal 12 is shown at the rest or fully extended position. In the rest or fully extended position, a gap 43 exists between first end 27 of arm 20 and abutment 24.

Now referring to FIG. 3, when reverse foot pedal 12 is in the intermediate position, there may be contact, or zero gap, between first end 27 of arm 20 and abutment 24. In the intermediate position, reverse sensing switch 14 is actuated. Actuation of reverse sensing switch 14 may be at or immediately before contact between first end 27 of arm 20 and abutment 24.

In FIG. 4, reverse foot pedal 12 is fully depressed to reach full speed in reverse. First end 27 of arm 20 has pushed against abutment 24 so that plate 21 has turned or pivoted in the second or clockwise direction. The clockwise movement of plate 21 pushes transmission control rod 13 rearward, enabling the tractor or vehicle to travel in reverse.

Thus, in one embodiment, the reverse implement option allows the operator to begin travel in reverse by depressing reverse foot pedal 12 further beyond the intermediate position. For example, to begin travel in reverse, reverse foot pedal 12 must be depressed at least about 0.5 inches from the rest or fully extended position, to pivot at least about 5 degrees. Generally, to begin travel in reverse, reverse foot pedal 12 must be depressed at least about 0.1 to 1.0 inches, pivoting at least about 1 to 10 degrees. To reach full speed in reverse, reverse foot pedal 12 may be fully depressed a maximum of about 2 inches to about 4 inches, pivoting a maximum of about 5 degrees to about 45 degrees.

In one embodiment, second end 28 of arm 20 may be bendable and/or stiffly flexible. For example, second end 28 may bend or deflect up to about 0.5 inches. Second end 28 may deflect or bend sufficiently to allow limited over travel of arm 20 to protect reverse implement switch 14 from damage after the push button is depressed fully. In one embodiment, the second end of arm may be a metal or polymer material having a material thickness of less than about 0.25 inches.

In one embodiment, compression spring 15 may provide a force opposing turning arm 20 in a first or counterclockwise direction, and may urge reverse foot pedal 12 toward the rest or fully extended position. In one embodiment, compression spring 15 may be positioned adjacent reverse implement switch 14, and secured to the frame or body of the tractor or vehicle. For example, the second end 28 of arm 20 may contact compression spring 15 when reverse foot pedal 12 is in the rest or fully extended position. Compression spring 15 may provide a force opposing movement of reverse foot pedal 12 and arm 20 toward the intermediate position, and may also provide a force opposing continued movement of the reverse foot pedal and arm toward the fully depressed or full speed in reverse position. In one embodiment, compression spring 15 may be positioned adjacent reverse implement switch 14.

The reverse implement option of the present invention allows the operator to engage the PTO for mowing or use of another attachment while traveling in reverse by actuating a hand operated switch and depressing the reverse foot pedal less than about 0.5 inches to actuate the reverse sensing switch. The reverse sensing switch is actuated when the reverse foot pedal reaches the intermediate position. The intermediate position is fixed with respect to the reverse foot pedal. Variations or adjustments to the hydrostatic transmission, transmission control rod, or other pedal and/or transmission linkages do not affect the location of the intermediate position, nor will it change the fixed distance that the reverse foot pedal moves to actuate the reverse sensing switch.

Having described the preferred embodiment, it will become apparent that various modifications can be made without departing from the scope of the invention as defined in the accompanying claims.

The invention claimed is:

1. An apparatus comprising:
   a reverse foot pedal on a tractor, the reverse pedal movable between a rest position, an intermediate position, and a fully depressed position;
   a movable transmission control rod linking the reverse foot pedal to a hydrostatic transmission swash plate; and
   an arm linked to the reverse foot pedal, the arm pivoting in response to movement of the reverse foot pedal to the intermediate position to actuate a reverse sensing switch before the transmission control rod moves to enable reverse travel of the tractor; and
   a PTO and a hand operated bypass switch, the PTO operating during reverse travel of the tractor if both the hand operated bypass switch and the reverse sensing switch are actuated.

2. The apparatus of claim 1 further comprising a shaft connected to the reverse pedal, a plate attached to the shaft, the transmission control rod pivotably connected to the plate.

3. The apparatus of claim 2 further comprising an abutment on the plate, the arm contacting the abutment to turn the plate to move the transmission control rod to enable reverse travel of the tractor.

4. The apparatus of claim 3 wherein the arm has a first end and a second end, the first end contacting the abutment to turn the plate, and the second end contacting the reverse sensing switch.

5. The apparatus of claim 1 further comprising a compression spring contacting the arm and urging the reverse foot pedal to the rest position.

6. The apparatus of claim 4 wherein the second end is bendable.

* * * * *